Fig. 4.

Dec. 8, 1936.                C. E. GLICK                2,063,498
                          PIPE CUTTING MACHINE
                         Filed Dec. 14, 1934         7 Sheets-Sheet 4

INVENTOR.
CLARENCE E. GLICK.
BY
ATTORNEY.

Dec. 8, 1936.  C. E. GLICK  2,063,498
PIPE CUTTING MACHINE
Filed Dec. 14, 1934  7 Sheets-Sheet 6

INVENTOR.
CLARENCE E GLICK.
BY
ATTORNEY.

Dec. 8, 1936.  C. E. GLICK  2,063,498
PIPE CUTTING MACHINE
Filed Dec. 14, 1934    7 Sheets-Sheet 7

INVENTOR.
CLARENCE E. GLICK.
BY
ATTORNEY.

Patented Dec. 8, 1936

2,063,498

UNITED STATES PATENT OFFICE 2,063,498

PIPE CUTTING MACHINE

Clarence E. Glick, Cleveland, Ohio, assignor, by mesne assignments, to The Oster Manufacturing Company, Cleveland, Ohio, a corporation of Ohio Application December 14, 1934, Serial No. 757,535

6 Claims. (Cl. 266—23)

My invention relates to a pipe cutting machine and particularly to a machine in which the cutting element is a torch and in which machine there is provided means for simultaneously generating the desired curve of cut, for either the ends or walls of pipe, and cutting the same on such generated curve.

By my invention, the tedious and expensive torch cutting process for the ends and walls of pipe which involved first providing a template of the desired curve, then marking the pipe according to such template and following the markings with a hand torch, may be eliminated.

One of the principal objects of my invention lies in the provision of a cutting machine of this type which is adjustably supported so as to be readily positioned with respect to the pipe for cutting either an end of the pipe or the wall of the pipe at any angle desired up to 90 degrees. This feature of the invention includes a novel mounting mechanism for the cutting machine.

Another object lies in the provision of means whereby through a simple adjustment the cutting machine is readily adapted for straight end cuts or angle end cuts (for miters) or for curved end cuts.

Still another object lies in the provision of a simple and easily assembled generating mechanism readily adjustable for various sizes of pipe and for various angles of cuts.

Other objects and advantages will be apparent as the description proceeds, reference now being had to the figures of the accompanying drawings forming a part of this application, and wherein like reference numerals indicate like parts.

The reference character 1 (see Figure 4) refers to a supporting base upon which may be provided two or more supporting plates 2 suitably secured to the base as by weldings 3 or otherwise. Rigidly mounted upon the supporting plates 2 is an upstanding supporting boss 4 provided with lateral flanges 5 at its lower end for substantial supporting engagement upon the base. These flanges may be rigidly secured to the base plates 2 by bolts, welding or other suitable means, and are reinforced by webs 4a.

Figure 4:
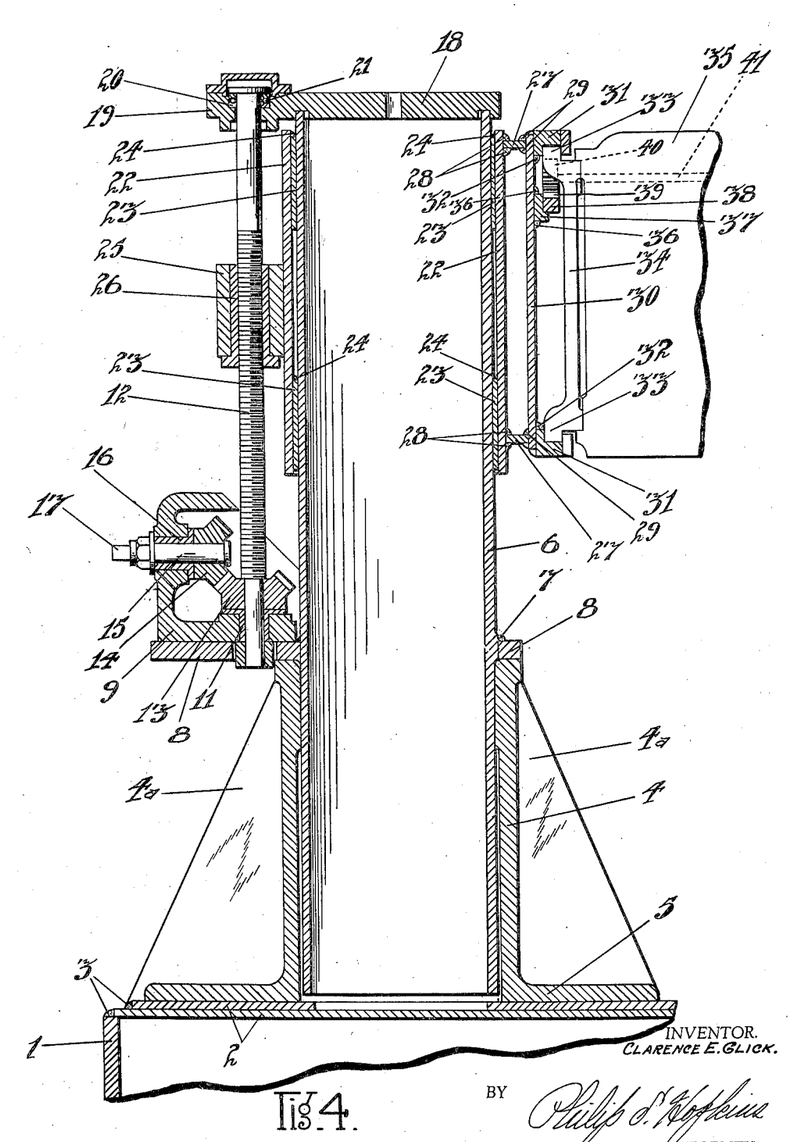
Figure 4 is a cross sectional view of the machine supporting and adjusting means.

Rotatably disposed within the hollow boss 4 is the lower end of a cylinder 6 projecting above the boss a substantial distance and serving as the supporting means for the machine as will be hereinafter described in detail. Rigidly secured to and around the cylinder 6, as by welding at the points 7, is a shelf-like flange 8, the portion thereof encircling the cylinder 6 resting upon the upper end of the hollow boss 4, thus providing a rotatable support for the cylinder 6 in such boss. A laterally projecting portion of the shelf 8 provides a support for a bracket 9 suitably secured thereto. Journaled in an opening through the bottom of this bracket 9 and extending downwardly through an opening 10 in the shelf 8, is a rotatable bearing 11, suitably secured within which is the lower end of an upwardly extending screw rod 12. Suitably fixed for rotation with the bearing 11 and the screw rod 12 is a beveled gear 13 meshing with a similar beveled gear 14 secured to a pintle 15 suitably rigidly attached to a rotatable bearing 16 provided in the upstanding portion of the bracket 9. One end of the pintle 15 projects outwardly beyond the bracket 9 and is provided with a squared end 17 adapted to receive a crank or other suitable tool whereby the same may be rotated.

From the foregoing it will be clear that the cylinder 6 and the shelf 8, together with the bracket 9 and the parts supported thereon are rotatably mounted within the supporting boss 4.

Also that upon rotation of the pintle 15, the screw rod 12 will likewise be rotated.

A cover member 18 is provided for the upper end of the cylinder 6 and has a laterally extending portion 19 recessed as at 20 to receive a thrust bearing 21 disposed therein for the upper end of the screw rod 12 which extends thereinto. This cover plate 18 obviously rotates with the cylinder 6 when the same is adjusted within the supporting boss 4. Any suitable clamping means may be provided for rigidly securing the cylinder 6 within the supporting boss in any adjusted position.

A cylindrical sleeve 22 is provided around the cylinder 6 for vertical sliding adjustment thereon. Bearing rings 23 rigidly secured to the sleeve 22 as by welding, at the points 24, or by other suitable means, provide the sliding fit engagement between the sleeve 22 and the cylinder 6.

Rigidly carried by the sleeve 22 is a cylindrical boss 25 within which is rigidly disposed an interiorly threaded member 26 having threaded engagement with the screw rod 12, the same passing therethrough. Obviously therefore, rotation of the screw rod 12 in the manner previously described will result in the sleeve 22 sliding up or down on the cylinder 12, depending upon the direction of rotation of the screw rod.

Secured to the sleeve 22 at a point thereon opposite the boss 25, are spaced supporting ribs 27. These may be welded to the sleeve as at 28 or otherwise secured thereto.

Rigidly secured to these supporting ribs 27, as by welding at 29, is a supporting plate 30 provided at its upper and lower edges with trackways or guides 31 rigidly secured to the supporting plate 30 as by welding at 32. These trackways or guides 31 are preferably of channel form as shown clearly in Figure 4 and are adapted to slidably receive the upper and lower edges 33 of a supporting bracket 34 rigidly secured to one side of a gear housing 35 within which is disposed a mechanism for generating the movement of the cutting torch as hereinafter described.

Also rigidly secured to the supporting plate 30, as by welding 36, is a supporting rib 37 provided with a rack bar 38, the upper edge of which is provided with teeth 39 with which are adapted to mesh the teeth of a pinion 40 (see Figure 2) mounted upon the adjacent end of a shaft 41 journaled in and extending through the gear box 35 and provided at its opposite projecting end with a hand wheel 42 whereby the same may be rotated to slidably adjust the gear box upon and along the guides 31 on the supporting plate 30.

It will thus be clear that not only is the gear box 35 and the parts carried thereby rotatably adjustable by virtue of the rotatable adjustment of the cylinder 6 within the supporting boss 4, and vertically adjustable by virtue of the adjustment of the sleeve 22, but is also laterally adjustable longitudinally of the supporting plate 30. The purpose of these adjustments will be apparent as the description proceeds.

Figures 1, 17:
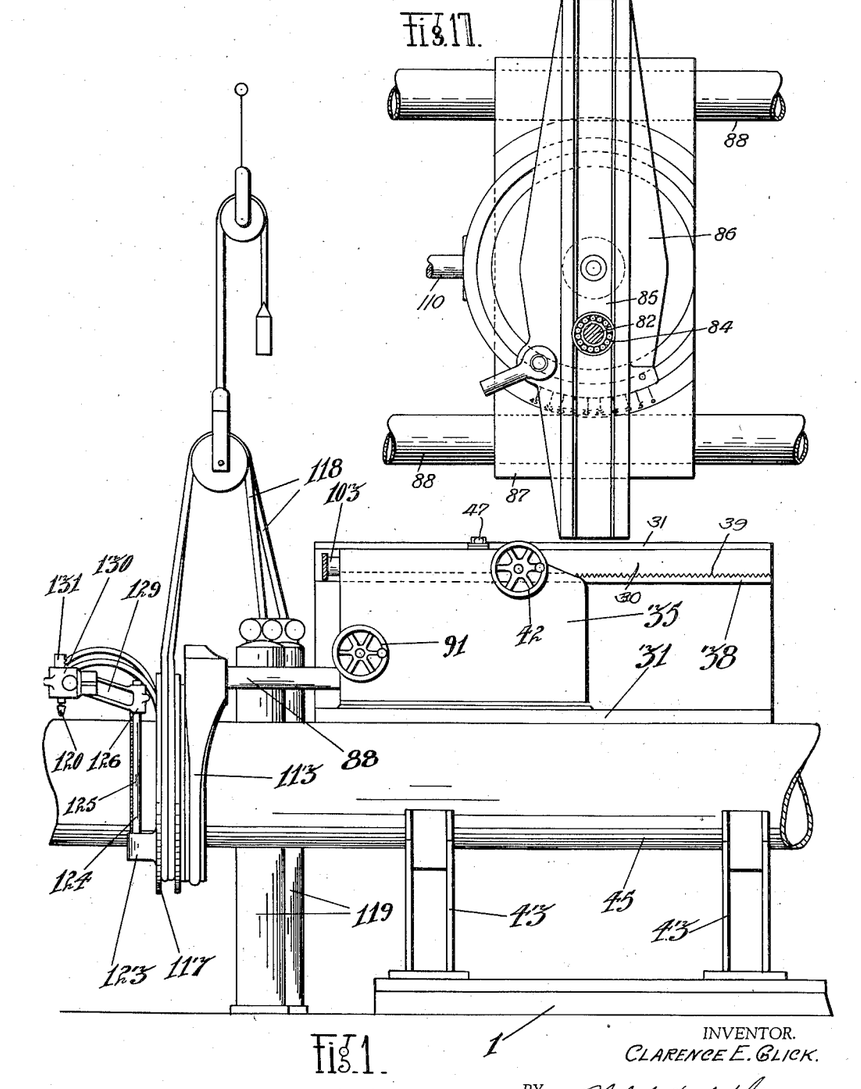
Figure 1 is a side view of my improved machine positioned for an end cut.
Figures 2, 3:
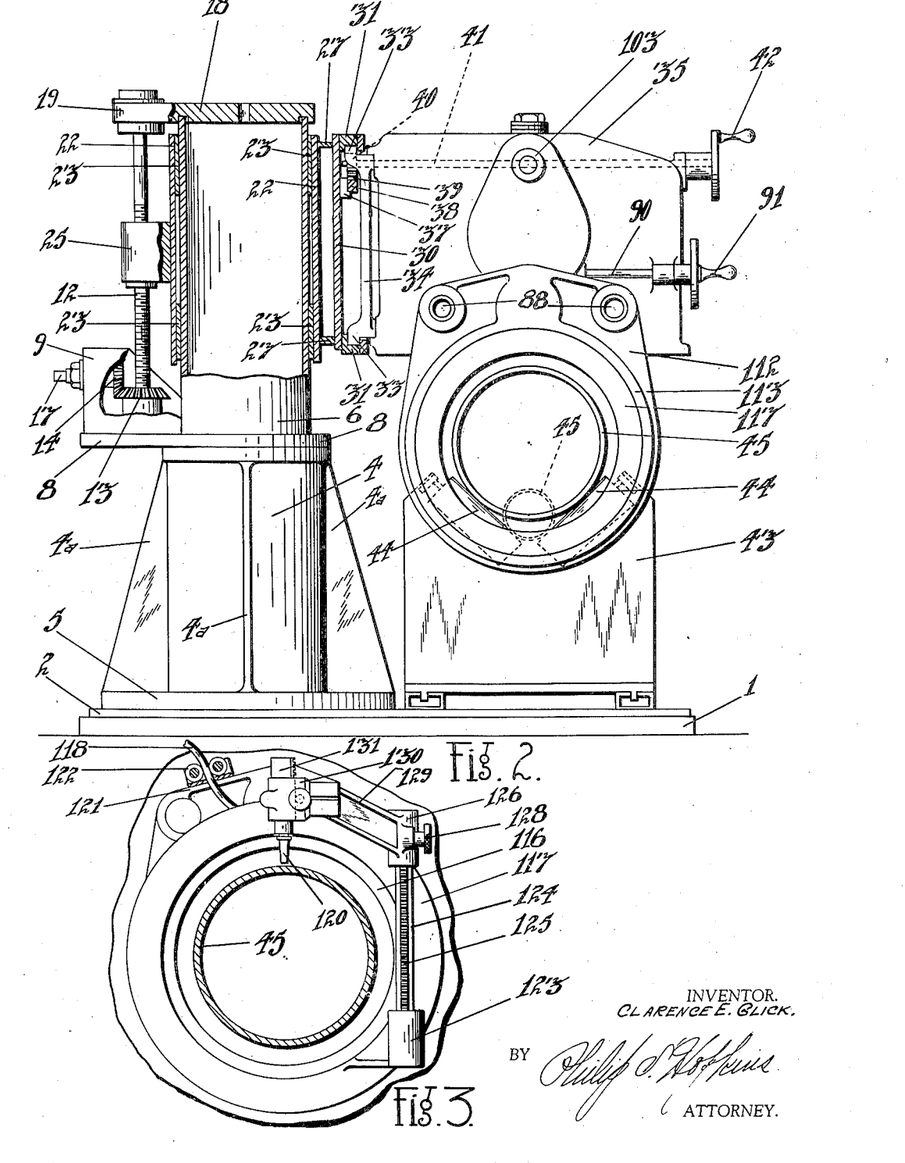
Figure 2 is a front view of the machine similarly positioned.
Figure 3 is a detail front view illustrating the adjustable torch support on the machine.

It will be noted particularly with reference to Figures 1 and 2 that there is also mounted upon the base 1, a plurality of V blocks 43 provided with anti-friction rollers 44 for the purpose of supporting a pipe 45 which is to be cut. The V blocks 43 may be suitably mounted for any desired adjustment for maximum convenience in supporting the pipe. It will be understood that the blocks are of a definitely determined heighth about the base and will support pipes of a great variety of sizes as indicated in dotted lines in Figure 2. The adjustments of the gear box rotatably and vertically, as well as longitudinally, are provided in order to position the cutting torch carried by the gear box, in a manner to be explained, properly with relation to the pipe, depending upon its size and the type and angle of cut to be made thereon.

Figures 5, 6:
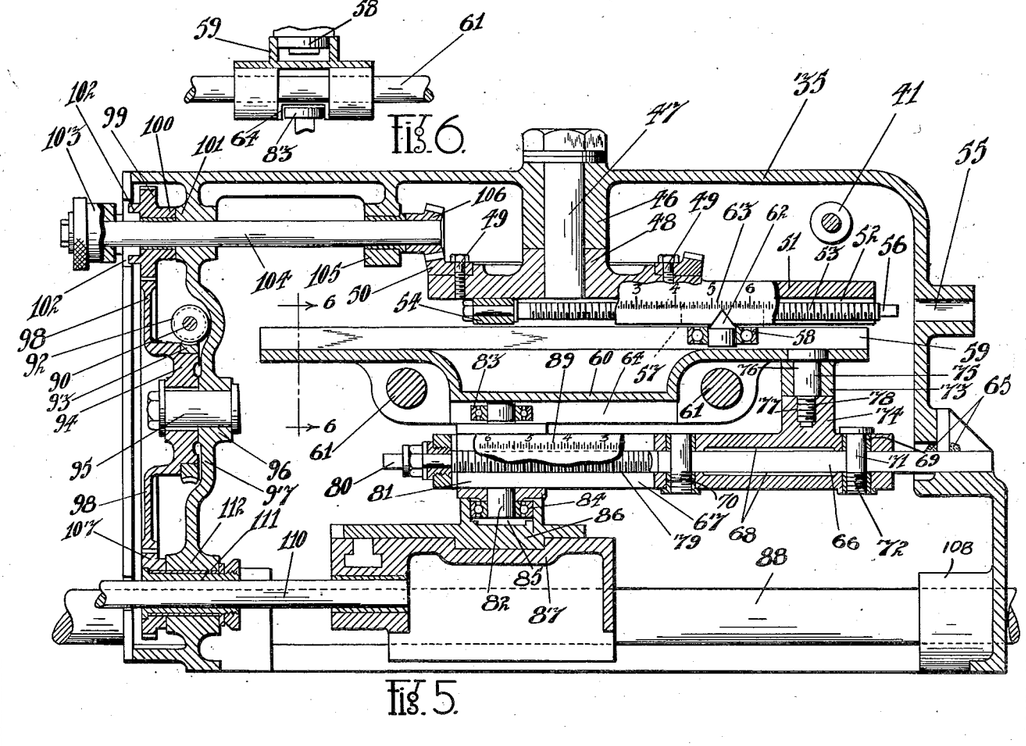
Figure 5 is a cross sectional view of the generating mechanism for the torch movement.
Figure 6 is a detail sectional view of a portion of the generating mechanism taken on the line 6—6 of Figure 5.

Referring now more particularly to Figure 5, it will be noted that there is provided in the top of the gear box 35 a downwardly depending boss 46 within which is journaled a pintle 47 carrying at its lower end a disk 48 on the upper side of which is suitably secured, as by bolts 49, a ring gear 50. A lateral extension 51 is provided on the underside of the disk 48 and slotted as at 52 to receive a screw rod 53 suitably journaled for rotation in bearings on the underside of the disk 48, one of which bearings is shown at 54. An opening 55 is provided in one end of the casing 35 to permit the insertion of a suitable crank or tool adapted to engage the end 56 of the screw rod whereby the same may be rotated. Mounted for movement longitudinally of the screw rod 53 as the same is rotated, is a follower 57 provided with a depending roller member 58 extending into the channel 59 of a carriage 60 suitably mounted for sliding movement upon a pair of parallel spaced supporting rods 61 suitably journaled in the sides of the gear box. The follower 57 may be provided with an indicating pointer 62 adapted to cooperate with a graduated scale 63 provided on the side of the extension 51 on the disk 48.

It will be obvious from the structure just described that rotation of the gear disk 48 and consequently of the extension 51 thereon, the roller 58 supported by such extension on the screw rod 53 will serve to move the carriage 60 upon the supporting rods 61 thereof, the extent of such movement being determined by the adjusted position of the roller 58 along the screw rod 53. Obviously if the roller 58 is adjusted to a position nearer the center of rotation, namely, the pintle 47, such movement of the carriage 60 will be slight whereas if the roller is adjusted to a position further away from such center, the sliding movement of the carriage will be greater. The adjustment of this roller follower 58 should correspond to the radius of the inside diameter of the intersecting pipe.

The underside of the carriage 60 is also provided with a channel 64 directly underlying and parallel with the channel 59.

Rigidly secured to one end of the gear box 35, as by welding at the points 65, is a fixed plate 66 extending into the gear box and forming at either one of two selected points a pivotal support for an arm 67. This arm is bifurcated as at 68 to engage both the upper and lower surfaces of the fixed plate 66, and openings 69 and 70 are provided through the bifurcated portion of the arm 67 and through the plate 66 to selectively receive a pivot pin 71, the lower end of which is threaded as at 72 for threaded engagement with the openings 70 which are threaded through the lowermost bifurcation of the arm 67.

Obviously if the pin 71 is placed in the opening 69 as shown in Figure 5, the radius of the arm 67 will be greater than if the pin 71 is fixed in the opening 70. The purpose of this selective pivotal arrangement for the arm 67 will be apparent as the description proceeds.

It may be noted also at this point that the carriage 60 is provided adjacent one end with a downwardly depending boss 73 and that the upper bifurcation of the arm 67 is provided with an upstanding boss 74 which may be aligned with the boss 73. The boss 73 is provided with an opening 75 adapted to receive a pin 76, the lower end of which is threaded as at 77 for threaded engagement within an opening 78 in the boss 74 whereby the arm 67 and the carriage 60 may be rigidly fastened together for a purpose to be described.

The end of the arm 67 opposite the bifurcated portion is recessed to receive a screw rod 79 suitably journaled for rotation therein and provided with an extending squared end 80 adapted to receive a crank or other tool whereby the same may be rotated. Riding upon the screw rod 79 is a threaded follower 81 provided with a vertically disposed pintle 82, the upper end of which is provided with an anti-friction roller 83 extending into the channel 64 of the carriage 60. The lower end of the pintle 82 is also provided with an anti-friction roller 84 extending into a channel 85 provided upon the upper side of a plate 86 suitably mounted upon a carriage 87 rigidly secured upon spaced supporting rods 88. The plate 86 is arcuately adjustable on the carriage 87 for a purpose to be described. The follower 81 may be provided with any suitable indicator (not shown) similar to the indicator 62, which cooperates with a scale 89 upon the lever 67 whereby to indicate the position of adjustment of the rollers 83 and 84 in the channels 64 and 85 respectively. This adjustment obviously brings the follower 81 nearer to or further away from the pivotal point of the arm 67 and the adjustment of this follower should be in accordance with the radius of the outside diameter of the pipe to be intersected.

It will now be clear that with the pivot pin 71 in the position shown in Figure 5, namely, in the opening 69, and with the pin 76 disengaged from the bosses 73 and 74 so that the same are not secured together, sliding movement of the carriage 60 along the supporting rods 61 in the manner heretofore described, will result in pivoting the arm 67 about the pin 71 as such carriage moves. This pivotal movement of the arm 67 causes the roller 84 on the follower 81 to describe an arcuate path, the arc of which is determined by the radius of the arm 67, resulting in longitudinal movement of the carriage 87 with the ways 88. It will likewise be clear that when the pivot pin 71 is in the opening 70, the same arcuate movement of the roller 84 will take place except that the arc will be on a shorter radius and the movement of the carriage 87 consequently greater. For header cuts at angles up to 45° the pin 71 is placed in the opening 69 and for cuts greater than 45° angles the pin 71 is placed in opening 70 to shorten the radius of the arm 67 and thereby increase the longitudinal movement of the carriage 87 and consequently of the torch. It will also be clear that with this arrangement one complete rotation of the disk 48 and extension 51, will result in sliding movement of the carriage 60 in one direction away from center, then back to center, then in the opposite direction away from center, and back to center. This is, of course, providing that the starting point of the rotation of the disk 48 is with the extension arm 51 on center. It will also be clear that such cycle of movement of the carriage 60 will result in moving the arm 67 in one direction away from center, then back to center, then in the opposite direction away from center, and back to center, such movement resulting in a rearward movement of the carriage 87, then a forward movement thereof, back to starting position, then a second rear movement thereof, and finally a forward movement thereof again back to starting position. The purpose of these movements will be apparent as the description proceeds.

It should be made clear at this point that the plate 86 on the top of the carriage 87 and which is provided with the channel 85, may be arcuately adjusted to any desired angular position on such carriage so as to dispose the guide channel 85 for the roller 84 in an angular position with respect thereto. This adjustment is made for the angle at which the cut on a header is to be made and determines the longitudinal movement of the carriage 87 and torch during the cycles above explained. Any suitable fastening means for the plate 86 in its adjusted positions may be provided.

Referring now to the front end of the gear casing 35, it will be noted that there is provided extending laterally across the casing, a shaft 90, one end of which extends outwardly and is provided outside of the casing with a hand wheel 91 (see Figure 2) by means of which the shaft can be rotated. It will be clear that this shaft might be likewise rotated by a motor drive if desired. Fixed to the shaft 90 is a worm gear 92. This meshes with a worm gear 93 secured upon a hub 94 rotatably journaled upon a stub shaft 95. This shaft is suitably journaled in a bearing 96 provided in a reinforcing partition 97 within the gear box. Also provided upon the hub 94, and preferably integral therewith, is a relatively large gear 98 meshing at a point on the upper side of its periphery with a gear 99 rotatably journaled upon a sleeve 100 fixed to a bearing 101 formed in the partition 97. The outer face of the gear 99 is provided with clutch teeth 102 adapted to cooperate with a slidable clutch member 103 slidably keyed upon a shaft 104 journaled in the bearing 101 and in a bearing 105 provided by a depending portion of the top of the casing 35. The inner end of the shaft 104 has secured thereto a beveled gear 106 adapted to mesh with the beveled ring gear 50 on the disk 48. Obviously therefore, with the parts shown as in Figure 5, namely, with the clutch 103 disconnected from the clutch 102, rotation of the shaft 90 and consequently of the gear 98 will result in the idle rotation of the gear 99, the shaft 104 and the gear disk 48, and the various parts previously described, as dependent upon the rotation of the disk 48, remaining stationary. If, however, the clutch 103 is moved into clutching engagement with the gear 99, the shaft 104 will rotate with the shaft 90 and produce the movements within the gear box previously described.

The large gear 98 meshes at the lower portion of its periphery with a gear 107 suitably keyed to a rotatably journaled shaft 111. This shaft is suitably journaled in a bearing 112 provided in a reinforcing partition 97 within the gear box. This gear 107 is secured to shaft 111, and shaft 111 is keyed to the rotatably slidable shaft 110 (see Figures 7, 8, and 9) projecting forwardly from the gear box and provided at its outer end with a pinion 109 (see Figure 10). Rotation of the shaft 90 and of the gear 98, therefore, results in rotation of the gear 107, shaft 110, shaft 111, and pinion 109.

Figure 9:
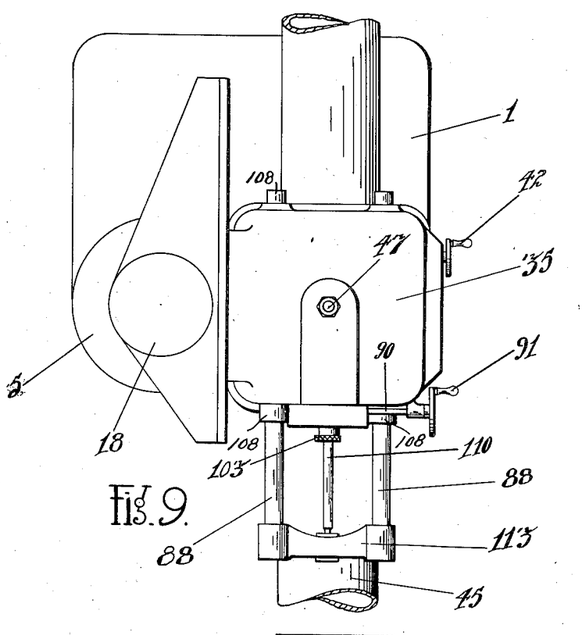
Figure 9 is a top plan view illustrating the position of the machine adjusted for cutting the end of a pipe.

Referring again to Figure 5 and also referring to Figure 9, it will be noted that rigidly secured to the carriage 87 is a pair of parallel bars 88 projecting outwardly through journals 108 in the ends of the casing 35, and being supported for slidable movement with the carriage 87. Obviously therefore, as the carriage 87 and the parallel bars 88 slide upon the supporting journals 108 heretofore described, the rotatably slidable shaft 110 moves therewith. The outer ends of the bars 88 support the ring gear housing 113. It should also be stated here that the pinion 107 on shaft 111 is keyed thereon for rotation therewith, but so arranged that shaft 110 is slidable therethrough in a manner to be described.

Figure 10:
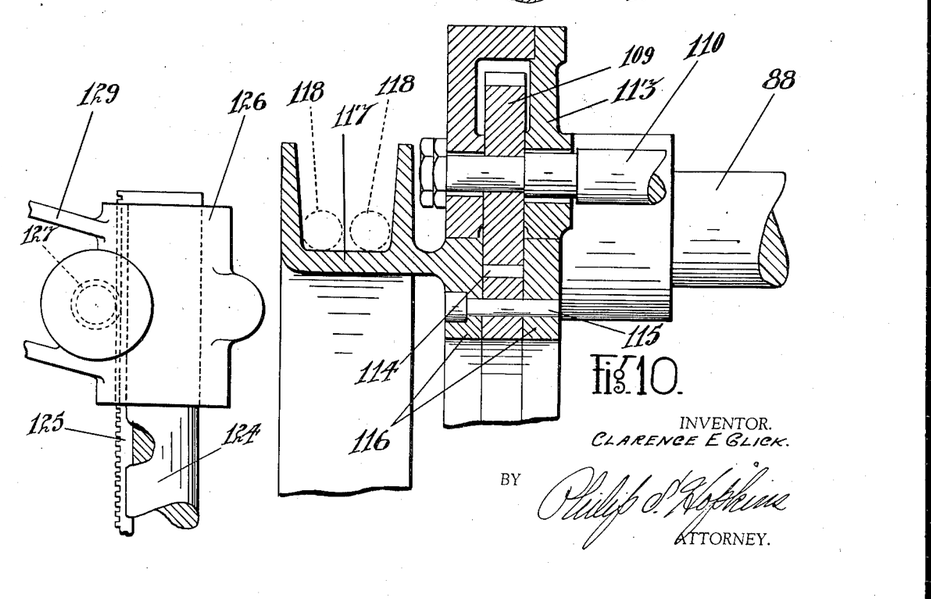
Figure 10 is a detail sectional view illustrating the driving mechanism for the torch carrying ring and showing also a portion of the torch arm carried thereby.

From Figure 10 it will be noted that the bars 88 and the shaft 110 are positioned within the ring gear housing and that the teeth thereof mesh with the teeth of a ring gear 114 rotatably journaled in the ring gear housing 113. Obviously therefore, rotation of the shaft 110 causes the ring gear 114 to rotate. Likewise adjustment of the carriage 87 in the gear box longitudinally causes the ring gear housing to move accordingly nearer to or further away from the housing. This movement is permitted due to the sliding movement of the shaft 110 through the rotatable geared journal 111. Consequently rotation of the ring gear may be accomplished simultaneously with the longitudinal adjustment thereof with the housing 113. When the ends of the pipe 45 are to be cut, the pipe passes through the ring gear, as shown clearly in Figures 1 and 2.

Securely bolted as at 115 to the ring gear 114 are the rings 116 rotatable with the gear. To the front ring 116 and preferably provided integral therewith, is a flanged hose drum 117 upon which, as the ring gear and the hose ring rotates, is adapted to be coiled or wound the hose lines 118 extending from the source of gas supply 119 to the cutting torch 120. A bracket 121 is suitably provided upon the ring gear housing and upon this bracket are disposed anti-friction rollers 122 between which the hose lines 118 are guided to and from the pulley ring 117.

Rigidly secured to the lower side of the pulley ring 117 is a supporting bearing 123 within which is rigidly secured a shaft 124 provided upon one side with a toothed rack 125. Adjustably mounted upon the shaft 124 is a bearing 126 within which is journaled a pinion 127 provided with a finger piece 128 whereby the same may be rotated to adjust the position of the bearing 126 upon the shaft 124, the pinion 127 meshing with the rack 125. Extending laterally from the bearing 126 is a supporting arm 129 to the free end of which is adjustably secured a torch holder 130 within which is adjustably mounted the torch arm 131 adjustable in the holder by means of a rack and pinion device, the details of which have been omitted as they form no part of this invention. The torch 120 is suitably secured to the holder 131. It is obvious that the various adjustments just described are provided in order that the torch 120 may be brought to operating position with respect to the pipe 45.

It will be clear that as the ring gear 114 rotates, the drum 117, the torch support and the torch will rotate therewith and depending upon the extent of rotation of the shaft 110, will cause the torch to move around the periphery of the pipe 45 for cutting. It will also be obvious that if during such rotation of the torch around the pipe the carriage 87 is reciprocated with the supporting rods 88, in the manner previously described, the torch will move longitudinally of the pipe 45 during its movement therearound.

Again referring to Figures 2, 4, and 5, the operation of the invention will now be clear. Assuming that a cut is to be made upon the end of the pipe 45, the pipe is placed upon the rollers of the supporting V blocks 43, the supporting cylinder 6 adjusted vertically to bring the ring gear 112 into position to concentrically encircle the pipe, depending upon its diameter, and the pipe then passed through the ring gear with its end in position to be cut by the torch. The gear housing 35 and the ring gear carried thereby is adjustable longitudinally on the supporting plate 30 as previously described, by means of the hand wheel 42, to position the torch properly with respect to the end of the pipe. If the end of the pipe is to be cut for a right angle intersection with a header pipe as shown at A in Figure 11, adjustment is first made of the screw rod 53 to bring the follower thereof to the proper position on the arm 51 in accordance with the radius of the inside diameter of the intersecting pipe. Next the pin 76 is disconnected from the boss 74 on the arm 67 and the pin 71 is engaged in the opening 69. The screw rod 79 is then adjusted to bring the follower 81 thereof to the proper position corresponding to the radius of the outside diameter of the pipe to be intersected, or header. The plate 86 is then adjusted on the carriage 87 so that the channel 85 thereof is at right angles to the carriage. The clutch 103 is then engaged with the pinions 102. With the torch adjusted to proper position with respect to the pipe, and lighted, the cutting operation is now ready to begin. Rotation of the shaft 90 now results in rotation of the shaft 104 and of the gear 50 resulting in sliding movement of the carriage 60 and consequent rocking of the arm 67 about the pivot 71, this in turn causing the carriage 87 to move longitudinally along with the bars 88, this movement being communicated to the torch through the ring gear housing, whereupon one complete rotation of the gear 50 will result in a complete rotation of the torch around the pipe and during such rotation will cause the torch first to move away from the end of the pipe longitudinally thereof and then return toward the end of the pipe and again away from the end and again toward the end, resulting in a cut on the end of the pipe of a shape to permit the right angular intersection shown at A in Figure 11 (see also Figure 12).

Figure 11:
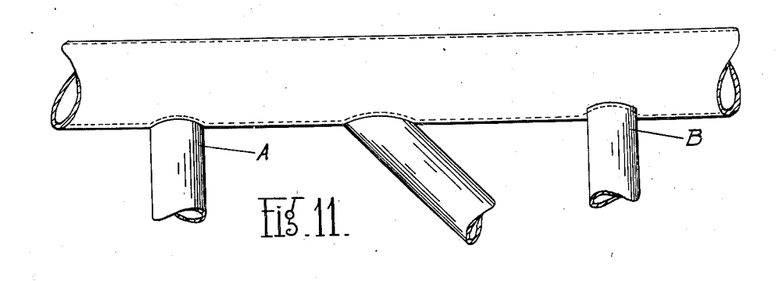
Figures 11 to 16 inclusive are detail figures illustrating the various types of cuts for which the machine is adaptable.
Figures 12, 13, 14, 15, 16:
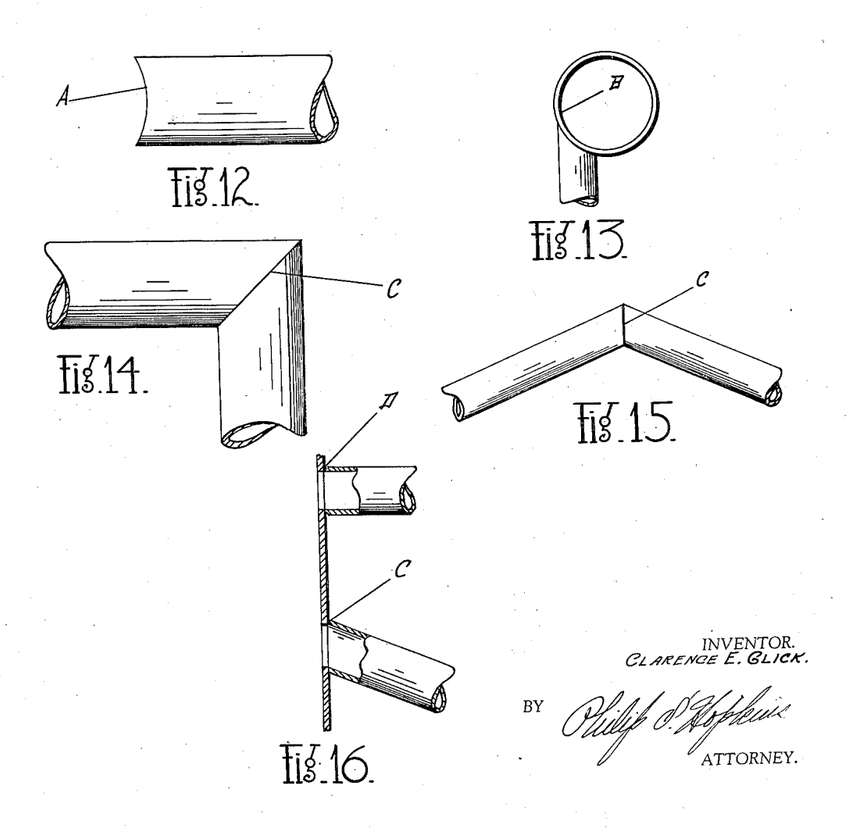

If the cut desired is for a right angular intersection but off center with respect to the header pipe, as shown at B in Figures 11 and 13, the plate 86 is adjusted arcuately with respect to the carriage 87 to bring the channel 85 thereof at the angle corresponding to the degree of offset desired. Obviously this will result in a longer longitudinal cut on the end of the pipe on one side thereof than that previously described, to compensate for the off center intersection desired.

If a miter cut is desired on the end of the pipe such as shown at C in Figures 14, 15, and 16, the pin 71 is removed entirely so as to disconnect the arm 67 and the plate 66 and the pin 76 is secured in the bosses 73 and 74 whereby to rigidly join together the carriage 60 and the arm 67. Obviously with this connection there will be no arcuate or pivoted movement on the part of the arm 67, it traveling rigidly with the carriage 60. The plate 86 is adjusted arcuately upon the carriage 87 to the desired angle of cut, and with the adjustments made of the screw rods 53 and 79 for the size of the pipe, it will be clear that rotation of the gear 50 will result in moving the carriage 87 first in one direction and then back to starting position, there being only one cycle of this longitudinal movement during the rotation of the torch around the pipe.

It should be explained that the reason for setting the adjustment screw rods 53 and 79 for internal and external diameters respectively of the pipe, is to bring the intersecting ordinates of both inside diameters of both pipes to a common intersecting point on the inside diameter of the header, to thus reduce the obstruction in the flow through the pipe. This type of setting is, of course, made only when it is desired to have the intersecting pipe end flush with the inside diameter of the header. When setting the intersecting pipe on the outside of the header, both screw rods are set to the outside diameter of each respective pipe.

If a straight cut is desired at the end of the pipe such as shown at D in Figure 16, the clutch 103 will be disconnected from the pinion 99 whereupon rotation of the shaft 90 will simply result in rotation of the torch around the pipe and with no longitudinal movement thereof along the pipe.

Figures 7, 8:
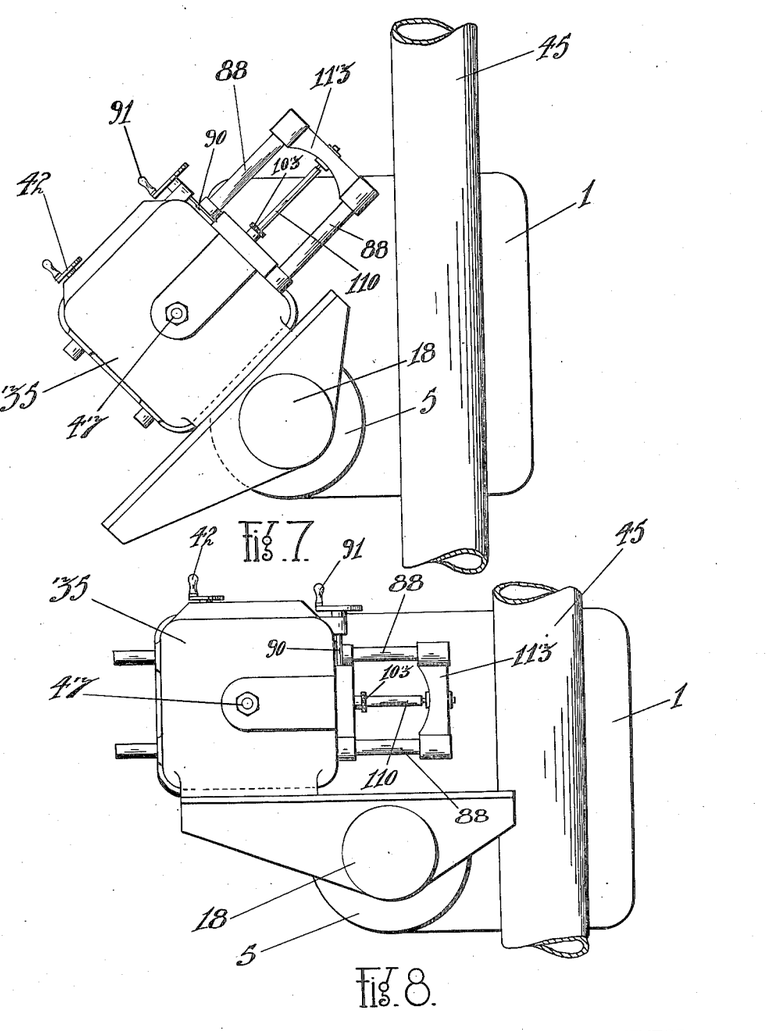
Figure 7 is a top plan view of the machine adjusted to a position for cutting at a 45 degree angle with respect to the pipe.
Figure 8 is a top plan view of the machine adjusted for cutting at a 90 degree angle with respect to the pipe.

When cuts are desired in the header pipe to provide the openings for the intersecting pipes, the cylinder 6 is rotated within the supporting boss 4 to bring the gear box and the torch to the desired angle with respect to the pipe as shown clearly in Figures 7 and 8. Obviously any desired angle of cut up to 90 degrees can be made in the side of the pipe. The adjustments for this type of cut have been described and the operation of the machine is the same.

It will thus be seen that I have provided a machine whereby the ends or side walls of a pipe may be provided with cuts for intersections, the generation of the cut being simultaneous with the cutting operation and only a few simple adustments being necessary for the different angles of cuts and different sizes of pipe.

Many changes may be made by way of detail without departing from the spirit and scope of my invention. I do not limit myself, therefore, to the form herein shown and described other than by the appended claims.

I claim:

1. An apparatus for cutting a cylinder for intersecting connections comprising a vertically disposed rotatable support, a sleeve on said support and vertically adjustable thereon, a laterally extending supporting plate fixed on said sleeve in substantially tangential relation thereto, a torch carrying member slidably adjustable on said supporting plate and a cutting torch adjustably mounted on said member.

2. An apparatus for cutting a cylinder for intersecting connections comprising a vertically disposed rotatable support, a sleeve on said support and vertically adjustable thereon, a laterally extending supporting plate fixed on said sleeve in substantially tangential relation thereto, a torch carrying member slidably adjustable on said supporting plate, a cutting torch adjustably mounted on said member, and means also on said member for causing said torch to describe a circle and for selectively causing said torch to generate a curve while describing such circle.

3. An apparatus for cutting a cylinder for intersecting connections comprising a cutting torch, means for causing said torch to describe a circle, means for causing said torch to generate a curve while describing such circle comprising a rotatable member, a slidable carriage movable by said member, a pivoted arm movable by said carriage, and a second slidable carriage supporting said torch movable by said arm.

4. An apparatus for cutting a cylinder for intersecting connections comprising a cutting torch, means for causing said torch to describe a circle, means for causing said torch to generate a curve while describing such circle comprising a rotatable member, a slidable carriage movable thereby, a pivoted arm movable by said carriage, and a second slidable carriage supporting said torch movable by said arm, the connections between said rotatable member and said first named carriage, between said first named carriage and said pivoted arm, and between said pivoted arm and said second named carriage all being adjustable to vary the generating movement of said torch.

5. An apparatus for cutting a cylinder for intersecting connections comprising a cutting torch, means for causing said torch to describe a circle, means for causing said torch to generate a curve while describing such circle comprising a rotatable member, a slidable carriage movable thereby, a pivoted arm movable by said carriage, and a second slidable carriage supporting said torch movable by said arm, the connections between said rotatable member and said first named carriage, between said first named carriage and said pivoted arm, and between said pivoted arm and said second named carriage all being adjustable to vary the generating movement of said torch, said pivoted arm being provided with a plurality of pivot points whereby the arc of movement thereof may be selectively varied.

6. An apparatus for cutting a cylinder for intersecting connections comprising a cutting torch, means for causing said torch to describe a circle, means for causing said torch to generate a curve while describing such circle comprising a rotatable member, a slidable carriage movable thereby, a pivoted arm movable by said carriage, and a second slidable carriage supporting said torch movable by said arm, the connections between said rotatable member and said first named carriage, between said first named carriage and said pivoted arm, and between said pivoted arm and said second named carriage all being adjustable to vary the generating movement of said torch, and means for selectively removing the pivot of said pivoted arm and securing said arm to said first named carriage for like movement therewith.

CLARENCE E. GLICK.